United States Patent
Khan et al.

(10) Patent No.: US 8,307,415 B2
(45) Date of Patent: Nov. 6, 2012

(54) SAFE HASHING FOR NETWORK TRAFFIC

(75) Inventors: Salahuddin Christopher Jules Khan, Redmond, WA (US); David Abzarian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1273 days.

(21) Appl. No.: 11/746,340

(22) Filed: May 9, 2007

(65) Prior Publication Data
US 2008/0282340 A1     Nov. 13, 2008

(51) Int. Cl.
*H04L 29/06* (2006.01)
(52) U.S. Cl. .......... 726/11; 713/152; 713/153; 713/154; 726/13; 726/22; 726/23
(58) Field of Classification Search .................. 707/747; 726/11, 13
See application file for complete search history.

(56) References Cited

U.S. PATENT DOCUMENTS

| | | | |
|---|---|---|---|
| 5,944,821 A | 8/1999 | Angelo | |
| 6,219,706 B1 * | 4/2001 | Fan et al. | 709/225 |
| 6,865,681 B2 | 3/2005 | Nuutinen | |
| 7,113,599 B2 | 9/2006 | Neves et al. | |
| 7,152,165 B1 | 12/2006 | Maheshwari et al. | |
| 7,587,575 B2 * | 9/2009 | Moertl et al. | 711/206 |
| 2002/0032798 A1 * | 3/2002 | Xu | 709/238 |
| 2003/0226032 A1 * | 12/2003 | Robert | 713/200 |
| 2004/0123139 A1 | 6/2004 | Aiello et al. | |
| 2005/0005165 A1 * | 1/2005 | Morgan et al. | 713/201 |
| 2005/0182929 A1 | 8/2005 | Kaniyar et al. | |
| 2007/0050395 A1 | 3/2007 | Hunter et al. | |
| 2007/0250836 A1 * | 10/2007 | Li et al. | 718/105 |
| 2008/0059620 A1 * | 3/2008 | Claise et al. | 709/223 |

FOREIGN PATENT DOCUMENTS
WO     03069828 A2     8/2003

OTHER PUBLICATIONS
Stephen Gill, Maximizing Firewall Availability, Version 1.8, Jun. 15, 2002.*
Yang et al., "IPSec/VPN Security Policy Correctness and Assurance", In Proceedings of Journal of High Speed Networking, Special issue on Managing Security Policies: Modeling, Verification and Configuration, 2006, pp. 1-22.

(Continued)

*Primary Examiner* — Jeffrey Pwu
*Assistant Examiner* — Thomas C Lauzon
(74) *Attorney, Agent, or Firm* — Senniger Powers LLP (57) ABSTRACT

Secure network communications between a source computer and a destination computer utilizing a firewall. The firewall determines a remote endpoint and the local physical memory address associated with a local endpoint included in the outbound request. The remote endpoint and the local physical memory address are hashed to generate an index value corresponding to an entry in an internal state table of the firewall. When an inbound request is received, the firewall determines a remote endpoint and the local physical memory address associated with a local endpoint included in the inbound request. The remote endpoint and the local physical memory address of the inbound request are hashed to generate an index value corresponding to an entry in the internal state table of the firewall. The firewall forwards the inbound request to the local endpoint if a matching entry is found in the internal state table at the index value.

19 Claims, 6 Drawing Sheets

OTHER PUBLICATIONS

Aiello et al., "Efficient, DoS-Resistant, Secure Key Exchange for Internet Protocols," CCS '02, Nov. 2002, ACM, 11 pages, USA.

Herzog et al., "Using the Java Sandbox for Resource Control," 13 pages, Sweden, 2002.

Crosby et al., "Denial of Service via Algorithmic Complexity Attacks," Proceedings of the 12th Usenix Security Symposium, Aug. 2003, pp. 29-44, USENIX Association, USA.

Unknown, "The New Windows Firewall in Windows Vista and Windows Server Longhorn," 8 pages, Jan. 2006, Microsoft Corporation, USA.

* cited by examiner

| INDEX (202) | LOCAL ADDRESS (204) | LOCAL PORT (206) | REMOTE ADDRESS (208) | REMOTE PORT (210) |
|---|---|---|---|---|
| 1 | xxx.xxx.xxx.xxx | 80 | xxx.xxx.xxx.xxx | 80 |
| 2 | xxx.xxx.xxx.xxx | 49 | xxx.xxx.xxx.xxx | 224 |
| ... | ... | ... | ... | ... |
| N | xxx.xxx.xxx.xxx | N | xxx.xxx.xxx.xxx | N |

SAFE HASHING FOR NETWORK TRAFFIC

BACKGROUND

Computer security is a major concern for networked computers. A firewall is commonly used to permit, deny, or proxy data connections between computers. Generally, most firewalls operate by blocking all unsolicited inbound data connections and only allowing solicited inbound connections. Solicited inbound connections are inbound connections sent in reply to an originating outbound request. Identifying whether a connection is solicited or not is determined by matching inbound connections against an internal state table. Entries are added to the internal state table whenever an outbound request is sent.

Typical firewall implementations perform lookups against this internal state table with or without hashing. Under normal circumstances hashing is desirable because it provides highly efficient lookups of entries in the internal state table. But, if an attacker determines the hashing algorithm used by the firewall, the attacker can craft packets that will create duplicate hash table entries. This leads to exceedingly long chains for an entry in the internal state table and thus, an extreme degradation of performance. Because the hashing algorithm only utilizes the data required to match the inbound connection based on the simple 5-tuple configuration (e.g., local port, local address, destination port, destination address, and protocol), 5-tuples can be easily guessed and manipulated to create collisions in the internal state table. Thus, firewalls that implement hashing are susceptible to denial of service attacks through extreme degradation of performance.

SUMMARY

Embodiments of the invention overcome one or more vulnerabilities associated with using a hash table in a firewall implementation. Aspects of the invention store the remote endpoint included in an outbound request in an entry of an internal state table. The remote endpoint is stored with reference to an index value in the internal state table generated by hashing the local physical memory address of a local endpoint and the remote endpoint.

When an inbound request is received, the local physical memory address is determined from the local endpoint included in the request. An index value is generated by hashing the local physical memory address and the remote endpoint. If an entry is found in the internal state table at the index value matching the index value for the inbound request, the request is allowed to proceed. If not, the request is evaluated as a new connection and permitted/rejected based on authorization policy.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
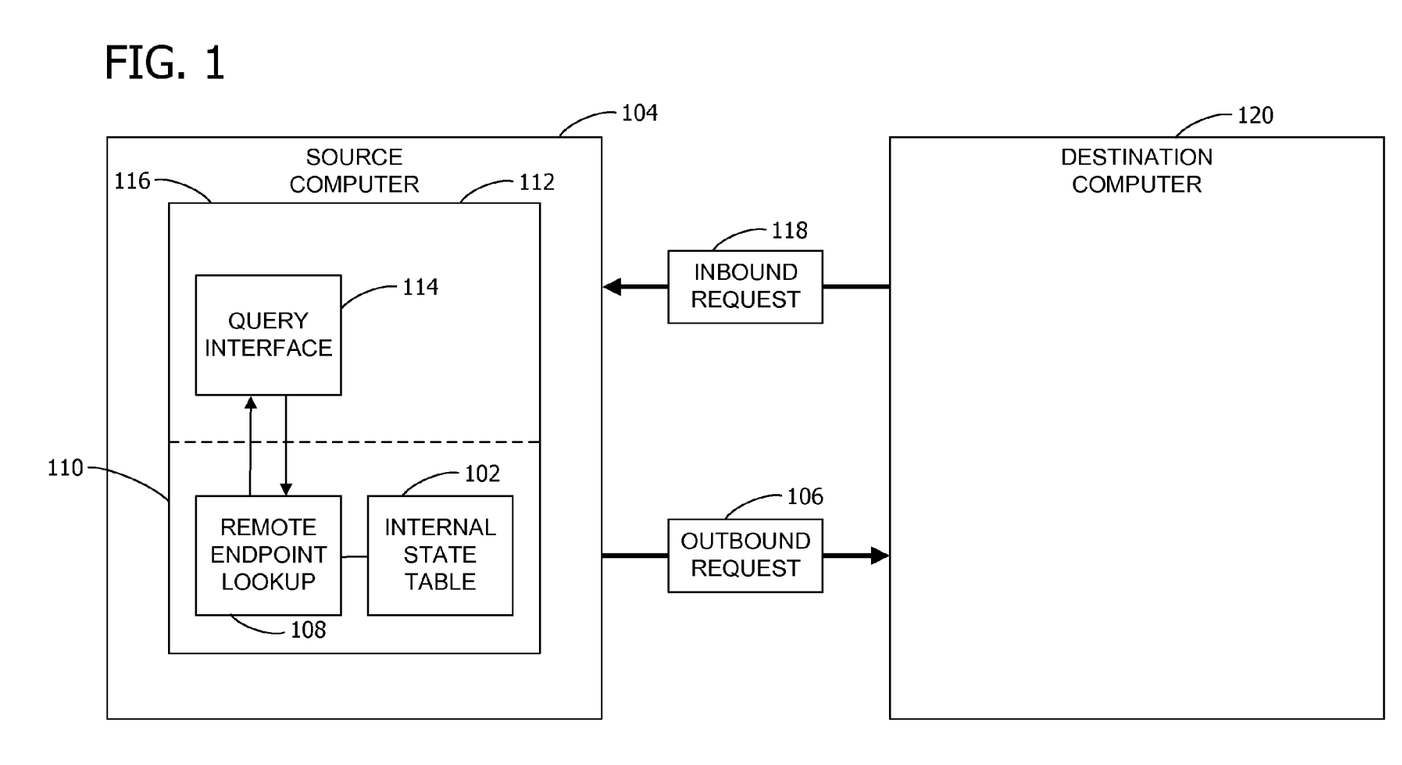
FIG. 1 is a block diagram illustrating one example of a suitable computing system environment in which the invention may be implemented.
Figure 2:
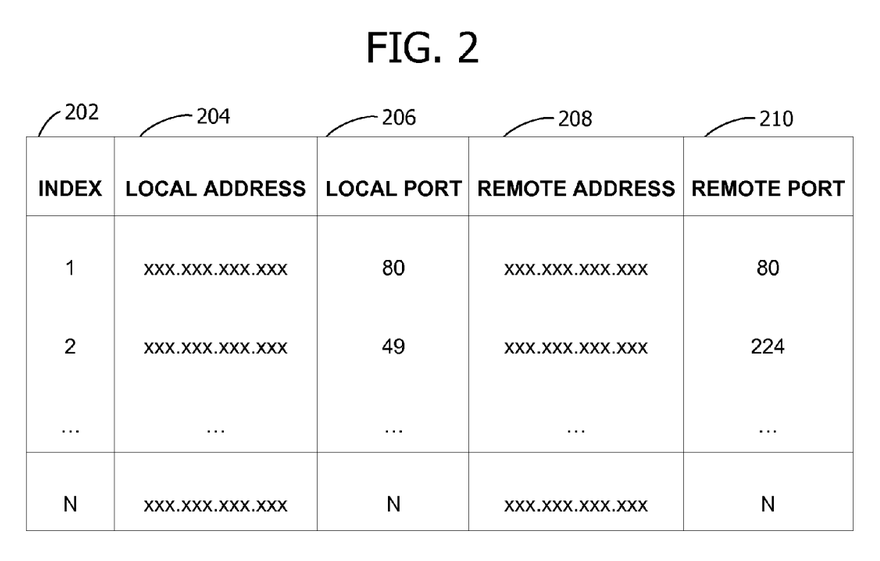
FIG. 2 is a block diagram illustrating an exemplary internal state table according to aspects of the invention.

Referring now to the drawings, FIG. 1 illustrates an embodiment of a system for an internal state table 102 for use with a firewall executed on a source computer 104. The internal state table 102 has entries for mapping a remote endpoint included in an outbound request 106 originated by the source computer 104 to a local endpoint also included the outbound request. Each endpoint comprises, for example, an Internet Protocol address and a port. FIG. 2 illustrates an exemplary embodiment of the internal state table 102. In embodiment of FIG. 2, an entry of the internal state table 102 includes, but is not limited to, at least one of the following: an index 202, a local address 204, a local port 206, a remote address 208, and a remote port 210.

Referring again to FIG. 1, the entries of internal state table 102 are indexed by hashing the remote endpoint specified by the outbound request and a secret. The source computer 104 generates the secret and associates the secret with the local endpoint. But the secret is not included in the outbound request 106. Advantageously, the secret associated with the local endpoint is unique and only available to the source computer 104. Thus, an attacker cannot guess the secret and use it to create a denial of service attack as described above. In an embodiment, the secret is the local physical memory address of the local endpoint.

For example, in a typical denial of service attack, the attacker creates "fake" outbound requests designed to cause collisions within the internal state table when the local endpoint and remote endpoint are hashed. First, the attacker will determine the hashing algorithm used by the firewall. Next, the attacker manipulates the remote endpoint of an outbound request to generate "fake" outbound requests from the local endpoint that will cause the firewall to create multiple entries in internal state table at a particular index values (e.g. collisions). However, because the secret is unique to the source computer, hashing both the secret and the remote endpoint specified in the outbound request ensures that the attacker cannot guess the needed parameters of the algorithm to craft "fake" response packets that will cause collisions in the internal state table. In other words, although an attacker's response may appear to properly specify the local and remote endpoints, the index value generated from the inbound packet will not likely match the index value generated by any originating outbound request. And in turn, when the firewall searches the internal state table as a function of the inbound request, the number of multiple entries for any particular index value will not be not be large enough to cause system degradation. In this manner, aspects of the invention reduce collisions, allow the same hash algorithm for IPv4 and IPv6 address, and improve performance of the internal state table lookups.

The system embodying aspects of the invention includes a remote endpoint lookup component 108 and an interface query component 114. In an embodiment, the endpoint lookup component 108 executes in kernel mode 110 of the operating system 112 of the source computer 104 while the interface query component 114 executes in user mode 116 of the operating system 112 of the source computer 104.

In operation, remote endpoint lookup component 108 receives an outbound request 106 originated by source computer 104. The request includes a local endpoint of the source computer 104 originating the request and the remote endpoint of a destination computer 120 to receive the request. The remote endpoint lookup component 108 determines the address of the remote endpoint included in the outbound request 106. The remote endpoint lookup component 108 also determines a secret associated with the local endpoint included in the outbound request 106. For example, the secret is the local physical memory address of the local endpoint. The remote endpoint lookup component 108 hashes the address of the remote endpoint and the secret to generate an index value corresponding to an entry in the internal state table 102. The remote endpoint lookup component 108 then stores the address of the remote endpoint in the internal state table 102 at the index value.

The interface query component 114 receives an inbound request 118 from a remote computer (e.g., destination computer 120) for initiating network communication. The inbound request 118 is addressed to the local endpoint of source computer 104. One skilled in the art will recognize that a remote computer may originate the request independently or in response to an earlier outbound request 106. Upon receiving the inbound request 118, interface query component 114 sends a query to the remote endpoint lookup component 108. The query includes, for example, the remote endpoint and the local endpoint included in the received inbound request 118.

The remote endpoint lookup component 108 receives the query from query interface 114 and determines a secret associated with the local endpoint. As described above, the secret may be the unique local physical memory address of the local endpoint. The remote endpoint lookup component 108 then generates a value as function of hashing the secret and the remote endpoint. This value may then be used for an index for a corresponding entry in the internal state table 102. The remote endpoint lookup component 108 searches for an entry in the internal state table 102 at the index of this generated value that includes the remote endpoint. As a result of the searching, remote endpoint lookup component 108 generates a status.

The interface query component 114 receives the status from the remote endpoint lookup component 108 and manages the received request to the local endpoint as a function of the status. For example, interface query component 114 forwards the inbound request 118 to the local endpoint if the status indicates that the entry in the internal state table 102 found using the hashed secret includes the remote endpoint. On the other hand, interface query component 114 rejects the inbound request 118 if the status indicates that the entry in the internal state table 102 does not include the remote endpoint.

For purposes of illustration, programs and other executable program components (e.g., query interface 114, remote endpoint lookup 108, and the operating system 112), are illustrated herein as discrete blocks. It is recognized, however, that such programs and components reside at various times in different storage components of the computer (e.g., source computer 104 and destination computer 120), and are executed by the data processor(s) of the computer (e.g., source computer 104 and destination computer 120).

In an embodiment, if no inbound request 118 from the remote endpoint is received before a timeout period has elapsed, the entry in the internal state table 102 including the remote endpoint is removed. And, if an inbound request 118 from the remote endpoint is received before the timeout period has elapsed, timeout period for the entry in the internal state table 102 is reset.

FIG. 1 shows one example of a general purpose computing device in the form of a computer (e.g., source computer 104 and destination computer 120). In one embodiment of the invention, a computer such as source computer 104 and destination computer 120 are suitable for use in the other figures illustrated and described herein. Computer (e.g., source computer 104 and destination computer 120) has one or more processors or processing units and a system memory.

The computer (e.g., source computer 104 and destination computer 120) typically has at least some form of computer readable media. Computer readable media, which include both volatile and nonvolatile media, removable and non-removable media, may be any available medium that may be accessed by computer (e.g., source computer 104 and destination computer 120). By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., source computer 104 and destination computer 120).

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The destination computer 120 and source computer 104 may operate in a networked environment using logical connections. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

As described above, FIG. 2 illustrates an exemplary embodiment of the internal state table 102. In embodiment of FIG. 2, an entry of the internal state table 102 includes, but is not limited to, at least one of the following: index 202, local address 204, local port 206, remote address 208, and remote port 210.

Figure 3:
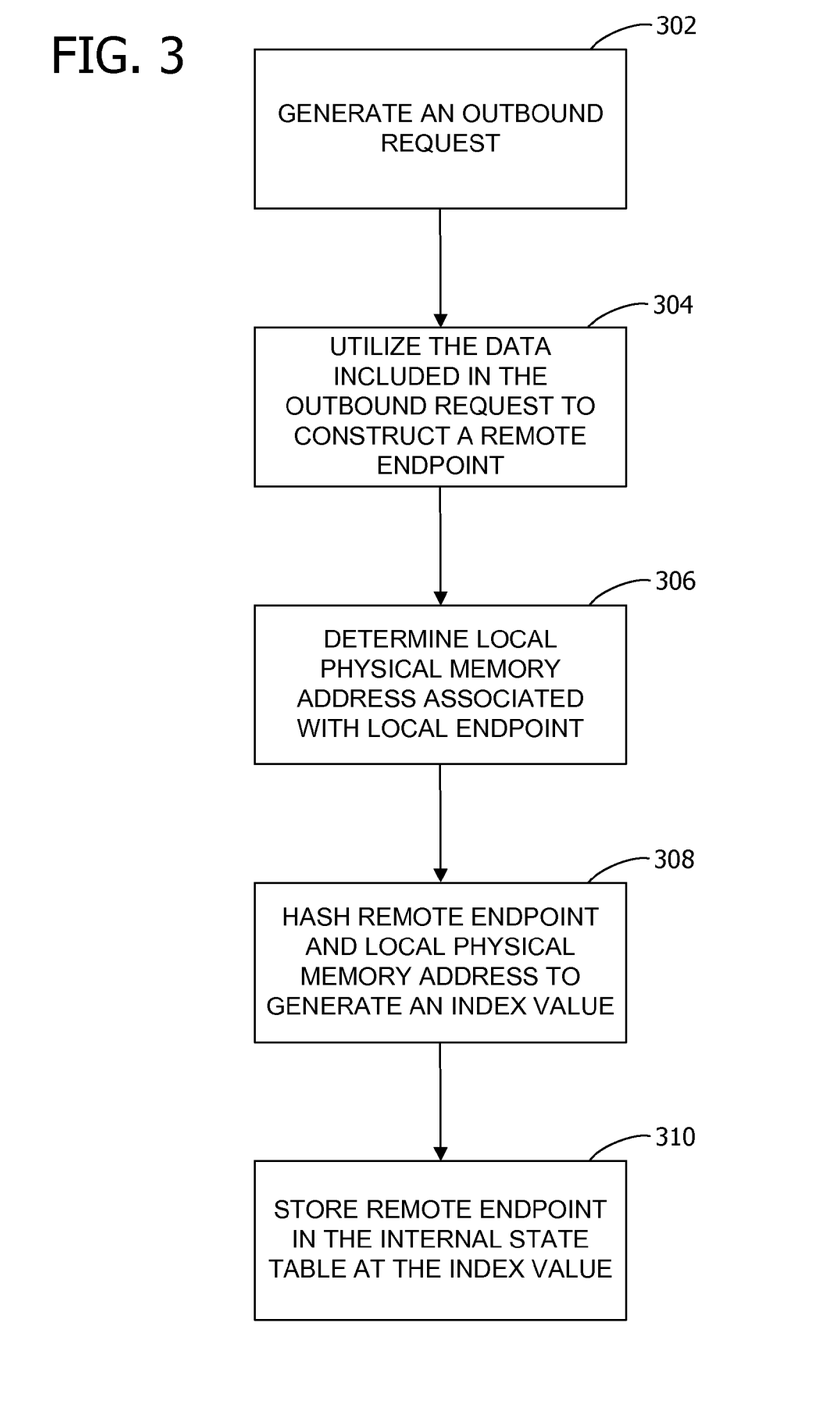
FIG. 3 is an exemplary flow diagram for storing a remote endpoint included in an outbound request in an internal state table.

FIG. 3 is a flow diagram of an embodiment for securing network communications between the source computer 104 and the destination computer 120. At 302, source computer 104 generates an outbound request 106 to destination computer 120. A firewall is between the source computer 104 and the destination computer 120. In an embodiment, the firewall located between the computers is implemented on the source computer 104. The outbound request 106 includes one or more of the following: a User Datagram Protocol (UDP) request and Transmission Control Protocol (TCP) request.

At 304, the firewall determines a remote endpoint address included in the outbound request 106. The outbound request 106 originates at a local endpoint of the firewall and is being sent to a remote endpoint of the destination computer 120. In an embodiment, an endpoint comprises an internet protocol address and a port. In another embodiment, the format of the address of the local endpoint and the remote endpoint are Internet Protocol version 4 (IPv4) addresses. Alternatively, the address of the local endpoint and the address of the remote endpoint are Internet Protocol version 6 (IPv6) addresses.

At, 306, the firewall determines the local physical memory address associated with a local endpoint address included in the outbound request 106. At 308, the firewall hashes the remote endpoint address and the local physical memory address to generate an index value. Advantageously, local physical memory address of the local endpoint is unique and only available to the source computer 104, thus an attacker cannot guess this address and use it create a denial of service attack as described above. For example, in a typical denial of service attack, the attacker creates "fake" outbound requests designed to cause collisions within the internal state table when the local endpoint and remote endpoint are hashed. First, the attacker will determine the hashing algorithm used by the firewall. Next, the attacker manipulates the remote endpoint of an outbound request to generate "fake" outbound requests from the local endpoint that will cause the firewall to create multiple entries in internal state table at a particular index values (e.g. collisions). However, because the local physical memory address is unique to the source computer, hashing both the local physical memory address and the remote endpoint specified in the outbound request ensures that the attacker cannot guess the needed parameters of the algorithm to craft "fake" outbound packets that will cause collisions in the internal state table. In other words, although an attacker's outbound request may appear to properly specify the local and remote endpoints, the index value generated from the outbound request will not likely match the index value generated by any other outbound request. And in turn, when the firewall searches the internal state table as a function of the inbound request, the number of multiple entries for any particular index value will not be not be large enough to cause system degradation. In this manner, aspects of the invention reduce collisions, allow the same hash algorithm for IPv4 and IPv6 address, and improve performance of the internal state table lookups.

The index value corresponds to an entry in the internal state table 102 of the firewall. In an embodiment, the internal state table 102 is implemented in the Application Level Enforcement (ALE) layer of the source computer 104. For example, the entries in the ALE state table may comprise: a local port, a local address, a destination port, a destination address, and a protocol. The internal state table 102 maps the local endpoint to the remote endpoint so that an inbound request 118 sent from the remote endpoint in response to the outbound request 106 will be accepted by the firewall.

The firewall hashes the 5-tuple (e.g., the local IP address, remote IP address, local port, and remote port) associated with mapping of the local endpoint to the remote endpoint. Alternatively, if the endpoint is included in a non-UDP (User Datagram Protocol) request, other criteria may be selected in place of the local port and remote port of the 5-tuple. For example, the ICMP (Internet Control Message Protocol) type and code may be used in place of the local port and the remote port. In another example, in the case of ICMP request/response, the ICMP ID is used as a substitute for the ICMP type and code.

At 310, the firewall stores the remote endpoint at the index value in the internal state table 102. The source computer 104 includes one or more computer-readable media have computer-executable instructions for performing the method described above and illustrated in FIG. 3. In an embodiment, the computer-executable instructions are executed in the kernel of an operating system (e.g., operating system 112 of source computer 104). Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices. In operation, computer (e.g., source computer 104 and destination computer 120) executes computer-executable instructions such as those illustrated in the figures to implement aspects of the invention.

Figure 4:
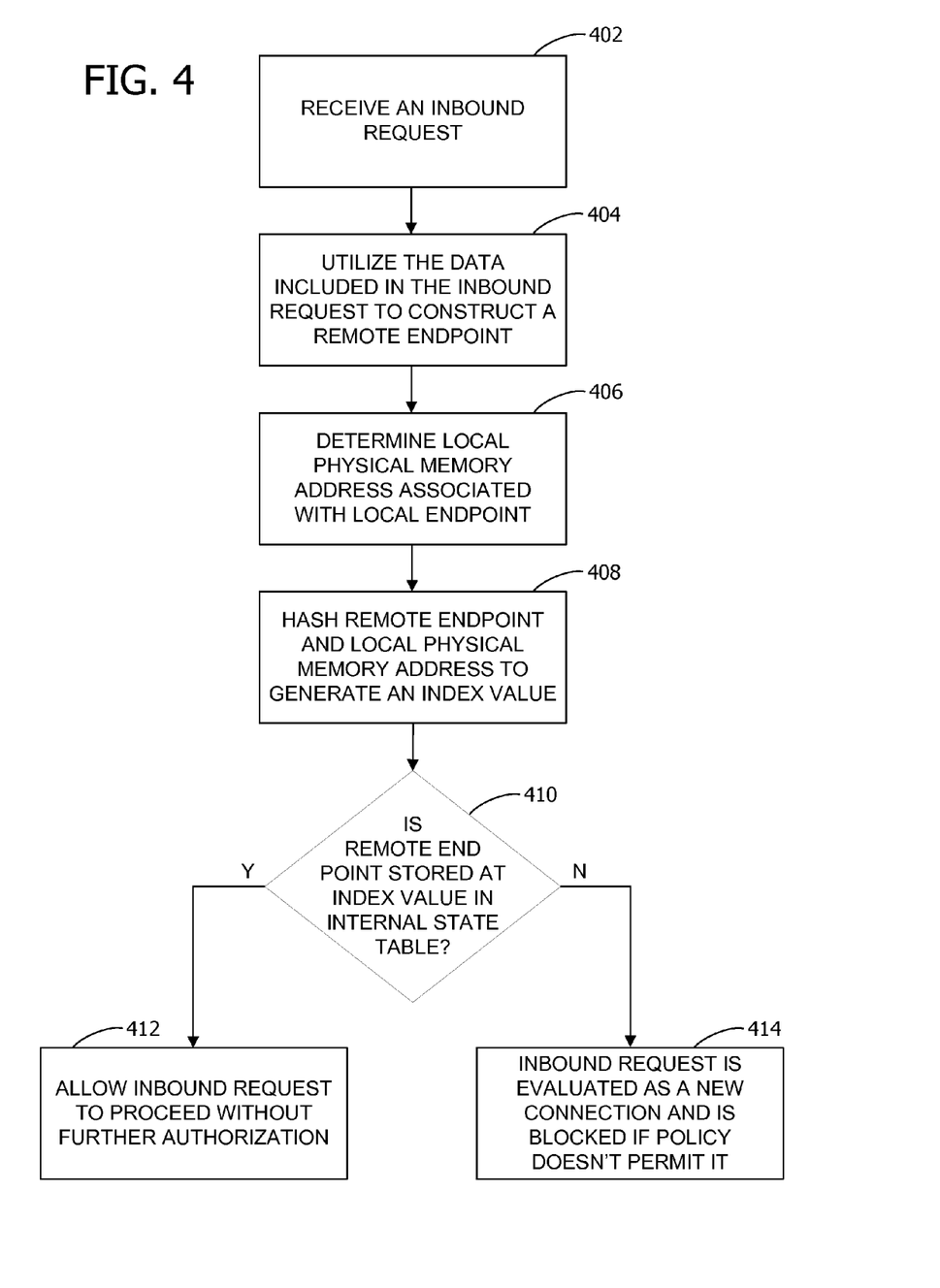
FIG. 4 is an exemplary flow diagram for searching an internal state table for an endpoint included in an inbound request.

FIG. 4 illustrates a method for looking up an entry in the internal state table 102. At 402, the firewall receives an inbound request 118 from destination computer 120. This request includes the remote endpoint and the local endpoint. In an embodiment, the format of the address of the local endpoint and the remote endpoint are Internet Protocol version 4 (IPv4) addresses. Alternatively, the address of the local endpoint and the address of the remote endpoint are Internet Protocol version 6 (IPv6) addresses. The inbound request 118 includes one or more of the following: a User Datagram Protocol (UDP) request and Transmission Control Protocol (TCP) request.

At 404, the firewall constructs the remote endpoint as a function of data included in the inbound request 118 (e.g., LocalAddress, LocalPort, Protocol, RemoteAddress, RemotePort and LocalEndpoint). At 406, the firewall determines the local physical memory address of the local endpoint included in the inbound request 118. At 408, the firewall hashes the address of the remote endpoint and the determined local physical memory address of a local endpoint to generate an index value corresponding to an entry in the internal state table 102. At 410, the firewall determines if the remote endpoint is stored in the internal state table 102 at the generated index value. In other words, the firewall determines if the internal state table 102 includes a matching entry for the remote endpoint of the inbound request 118. For example, the basic information that identifies a connection (e.g., LocalAddress, LocalPort, Protocol, RemoteAddress, RemotePort and LocalEndpoint) is utilized to populate a data structure. Next, the relevant information from the structure is hashed and a lookup/comparison is performed using the data structure. If so, at 412, the firewall forwards the inbound request 118 to the local endpoint. If not, at 414, the firewall rejects the inbound request 118.

In an alternative embodiment, after a timeout period has elapsed, the entry in the internal state table 102 is removed if no inbound request 118 from the remote address is received. Additionally, the timeout period of the entry in the internal state table 102 is reset if an inbound request 118 from the remote address is received.

Figure 5:
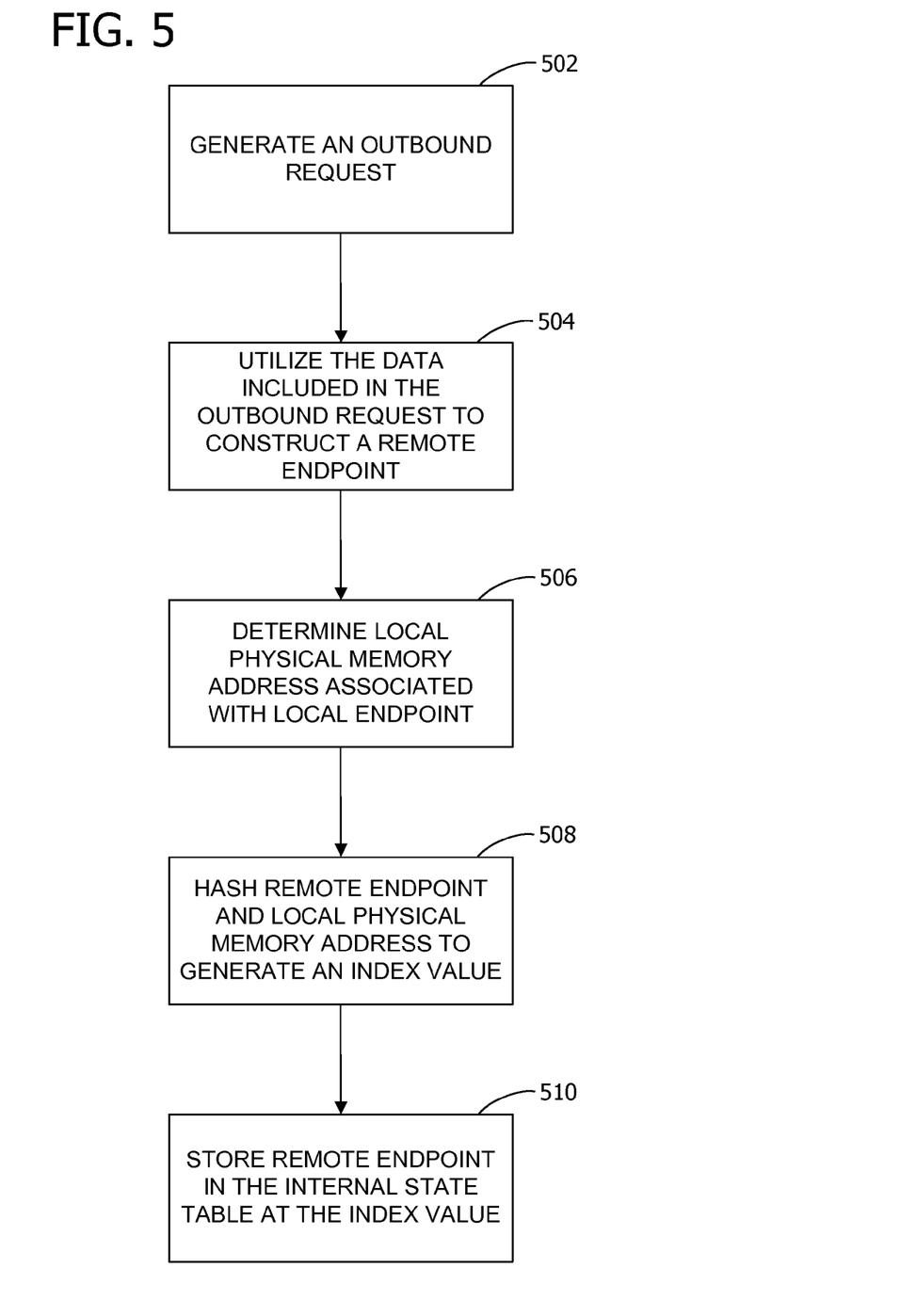
FIG. 5 is an exemplary flow diagram for storing a remote endpoint included in an outbound request in an internal state table.

FIG. 5 illustrates an embodiment for hashing entries in an internal state table 102 of a firewall of a source computer 104 to prevent a denial of service attack. The internal state table 102 stores a remote endpoint and a local endpoint. In an embodiment, the format of the address of the local endpoint and the remote endpoint are Internet Protocol version 4 (IPv4) addresses. Alternatively, the address of the local endpoint and the address of the remote endpoint are Internet Protocol version 6 (IPv6) addresses.

In an embodiment, the internal state table 102 is an application level enforcement state table. The entries in the application level enforcement state table include, but are not limited to, a local port, a local address, a destination port, a destination address and a protocol.

At 502, the source computer 104 generates an outbound request 106 including the remote endpoint and the local endpoint. The local endpoint is associated with a local physical memory address of the source computer 104. At 504, the source computer 104 constructs the remote endpoint as a function of data included in the outbound request 106 (e.g., LocalAddress, LocalPort, Protocol, RemoteAddress, RemotePort and LocalEndpoint).

At 506, the source computer 104 determines the local physical memory address of the local endpoint included in the outbound request 106. The local physical memory address is not included in the outbound request 106. At 508, the source computer 104 hashes the address of the remote endpoint and the local physical memory address of a local endpoint to generate an index value to an entry in the internal state table 102. Advantageously, local physical memory address of the local endpoint is unique and only available to the source computer 104, thus an attacker cannot guess this address and use it create a denial of service attack as described above.

In an embodiment, the following hash routine used to generate the index value; the hashContext starts out initially as 0 and is further modified by each additional call with new data.

```
void
HashRoutine(
    _in UCHAR* data,
    _in ULONG dataSize,
        _in_out ULONG_PTR* hashContext)
{
    ULONG i;
    for (i=0; i < dataSize; i++)
    {
        hashContext = (hashContext * 37) + data[i];
    }
}
```

Alternatively, any other efficient hash routine that yields a good distribution over the hash buckets may be used.

At 510, the source computer 104 stores the remote endpoint at the entry at the index value of the internal state table 102.

Figure 6:
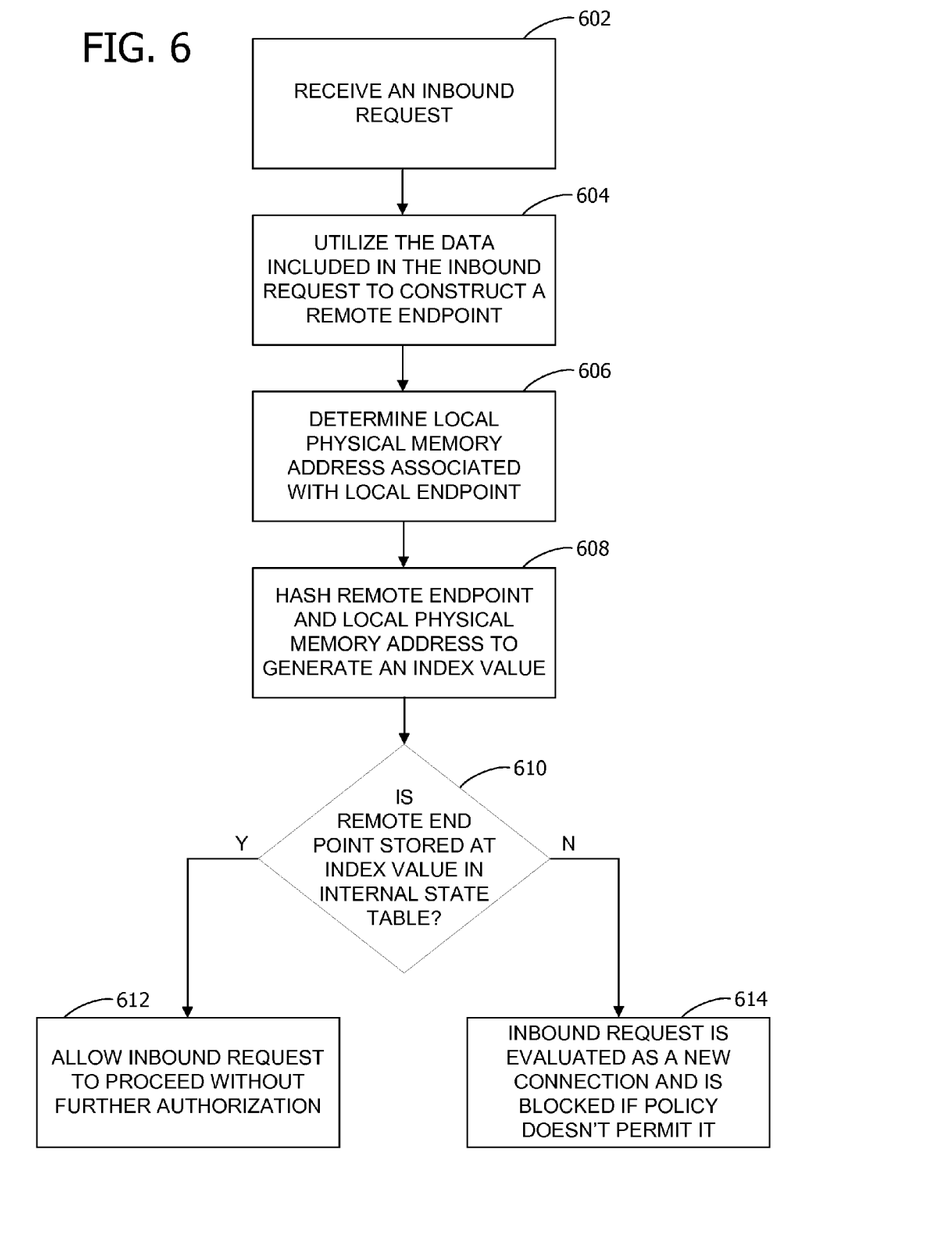
FIG. 6 is an exemplary flow diagram for searching an internal state table for an endpoint included in an inbound request.

FIG. 6 illustrates an embodiment for performing a lookup in the internal state table of the firewall. At 602, the source computer 104 receives an inbound request 118 from the destination computer 120 including the remote endpoint and the local endpoint. In an embodiment, the format of the address of the local endpoint and the remote endpoint are Internet Protocol version 4 (IPv4) addresses. Alternatively, the address of the local endpoint and the address of the remote endpoint are Internet Protocol version 6 (IPv6) addresses. At 604, the source computer constructs the remote endpoint as function of data included in the outbound request (e.g., LocalAddress, LocalPort, Protocol, RemoteAddress, RemotePort and LocalEndpoint). At 606, the source computer 104 determines the local physical memory address of the local endpoint from the address of the local endpoint included in the inbound request 118.

At 608, the source computer 104 hashes the remote endpoint and the determined local physical memory address of a local endpoint to generate an index value of an entry in the internal state table 102. At 610, the source computer 104 determines if the remote endpoint is stored in the internal state table 102 at the generated index value. In an embodiment, if an entry is found with a matching index value, the other corresponding data is compared to the entry (e.g., Internet Protocol addresses, ports, protocols, etc). If the entry does not match, then the other entries (if they exist) with the same index value will be searched until a match is found. If no match is found and all entries for the index value have been exhausted, then the inbound request is evaluated as a new connection and permitted/rejected based on authorization policy. For example, the basic information that identifies a connection (e.g., LocalAddress, LocalPort, Protocol, RemoteAddress, RemotePort and LocalEndpoint) is utilized to populate a data structure. Next, the relevant information from the structure is hased and a lookup/comparison is performed using the data structure.

If an entry was found at 610, the inbound request 118 is forwarded to the local endpoint at 612. If not, at 614, the source computer 104 rejects the inbound request 118.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of securing network communications between a source computer and a destination computer, said source computer and said destination computer having a firewall therebetween, said method comprising:
   constructing a remote endpoint as function of the data included in an outbound request, said outbound request originating at a local endpoint of the source computer and being sent to a remote endpoint of the destination computer;
   determining a local physical memory address associated with a local endpoint included in the outbound request, said local physical memory address unique to the local endpoint and unknown to the remote endpoint;
   hashing, by the firewall, the remote endpoint and the local physical memory address to generate a single outbound index value;
   indexing into an entry in an internal state table of the firewall, said internal state table comprising an application level enforcement (ALE) state table and said entry in the internal state table uniquely corresponding to the outbound index value, said internal state table not storing the local physical memory address; and
   storing the remote endpoint in the internal state table at the indexed entry corresponding to the outbound index value.

2. The method of claim 1, further comprising:
   receiving an inbound request from the destination computer, said inbound request including the local endpoint;
   constructing the remote endpoint from data included in the inbound request;
   determining the local physical memory address from the local endpoint included in the inbound request;
   hashing the remote endpoint and the determined local physical memory address from the inbound request to generate a single inbound index value;
   indexing into an entry in the internal state table of the firewall, said entry in the internal state table uniquely corresponding to the inbound index value;
   determining if the remote endpoint is stored in the internal state table at the inbound index value;
   forwarding the inbound request to the local endpoint if the remote endpoint is stored in the internal state table at the inbound index value; and
   rejecting the inbound request if the remote endpoint is not stored in the internal state table at the inbound index value.

3. The method of claim 1, wherein the destination computer and source computer are networked via the internet.

4. The method of claim 1, wherein each endpoint comprises an internet protocol address and a port.

5. The method of claim 1, wherein the request includes one or more of the following: a User Datagram Protocol (UDP) request and Transmission Control Protocol (TCP) request.

6. The method of claim 1, wherein the internal state table has an entry including one or more of the following: a local port, a local address, a destination port, a destination address, and a protocol.

7. The method of claim 1, further comprising removing the entry in the internal state table corresponding to the outbound index value after a timeout period has elapsed.

8. The method of claim 7, further comprising resetting the timeout period of the entry in the internal state table when an inbound request from the remote endpoint is received.

9. The method of claim 1, further comprising formatting addresses of the local endpoint and the remote endpoint according to at least one of the following:
   Internet Protocol version 4 (IPv4) and Internet Protocol version 6 (IPv6).

10. The method of claim 1, wherein one or more computer-readable media have computer-executable instructions for performing the method recited in claim 1.

11. A method for hashing entries in an internal state table of a firewall of a source computer to prevent a denial of service attack, said internal state table storing a remote endpoint and a local endpoint, said endpoints being included in an outbound request generated by said source computer, said local endpoint being associated with a local physical memory address of the source computer, said method comprising:
   constructing the remote endpoint as a function of the data included in the outbound request;
   determining a local physical memory address of the local endpoint included in the outbound request, wherein the local physical memory address is not included in the outbound request, said local physical memory address unique to the local endpoint and unknown to the remote endpoint;
   hashing the remote endpoint and the local physical memory address of a local endpoint to generate a single outbound index value;
   indexing into an entry in the internal state table, said internal state table comprising an application level enforcement (ALE) state table having entries for local port, local address, destination port, destination address, and protocol, and not storing the local physical memory address unique to the local endpoint, said entry in the internal state table uniquely corresponding to the outbound index value; and
   storing the remote endpoint at the entry at the indexed entry corresponding to the outbound index value of the internal state table.

12. The method of claim 11, further comprising:
   receiving an inbound request from the destination computer, said inbound request including the remote endpoint and the local endpoint;
   constructing the remote endpoint as a function of the data included in the inbound request;
   determining a local physical memory address of the local endpoint from the local endpoint included in the inbound request;
   hashing the remote endpoint and the determined local physical memory address from the inbound request to generate an inbound index value, said inbound index value corresponding to an entry in the internal state table of the firewall;
   determining if the remote endpoint is stored in the internal state table at the inbound index value;
   forwarding the inbound request to the local endpoint if the remote endpoint is stored in the internal state table at the inbound index value; and
   rejecting the inbound request if the remote endpoint is not stored in the internal state table at the inbound index value.

13. The method of claim 11, wherein the internal state table has an entry including one or more of the following: a local port, a local address, a destination port, a destination address, and a protocol.

14. The method of claim 11, further comprising formatting addresses of the local endpoint and the remote endpoint according to at least one of the following:

Internet Protocol version 4 (IPv4) and Internet Protocol version 6 (IPv6).

15. A firewall system comprising:
an internal state table having entries for mapping a remote endpoint to a local endpoint, said remote endpoint and said local endpoint being included in an outbound request originated by a source computer, said entries in the internal state table being indexed by hashing the remote endpoint and a secret, said secret being generated by the source computer and comprising a unique local physical memory address of the local endpoint, said secret unknown to the remote endpoint, and said secret not being included in the outbound request;
a remote endpoint lookup component executing in kernel mode of an operating system of the source computer for:
 receiving a query including a remote endpoint and a local endpoint;
 determining the secret associated with the local endpoint of the query;
 hashing the secret and the remote endpoint of the query to generate a single index value;
 indexing into an entry in the internal state table at the generated index value, said entry uniquely corresponding to the generated index value; and
 storing the remote endpoint of the query at the indexed entry; and
an interface query component executing in user mode of the operating system of the source computer for:
 receiving an inbound request originated by a destination computer and addressed to the local endpoint of the source computer, said inbound request including the local endpoint;
 constructing the remote endpoint as a function of the data included in the inbound request;
 generating a query that includes the remote endpoint and the local endpoint of the received inbound request and sending the query to the remote endpoint lookup component;
 receiving the status from the remote endpoint lookup component wherein the received request is forwarded to the local endpoint as a function of the received status.

16. The system of claim 15, wherein the entry in the internal state table includes at least one of the following: a local port, a local address, a destination port, a destination address, and a protocol.

17. The system of claim 15, wherein the interface query component is further configured for:
 forwarding the received inbound request to the local endpoint if the status indicates that the entry of the internal state table includes the remote endpoint; and
 rejecting the inbound request if the status indicates that the entry of the internal state table does not include the remote endpoint.

18. The system of claim 15, wherein the remote endpoint lookup component is further configured for:
 receiving the outbound request originated by the source computer, said outbound request including the local endpoint of the source computer originating the request and the remote endpoint of the destination computer to receive the request;
 constructing the remote endpoint as a function of the data included in the outbound request;
 determining the secret associated with the local endpoint wherein the local endpoint is included in the outbound request;
 hashing the remote endpoint and the secret to generate an index value corresponding to an entry in the internal state table; and
 storing the remote endpoint in the internal state table at the index value for the outbound request.

19. The system of claim 15, wherein the entry in the internal state table for the outbound request is removed after a timeout period has elapsed if no inbound request from the remote endpoint is received; and wherein the timeout period of the entry in the internal state table is reset if an inbound request from the remote endpoint is received.

\* \* \* \* \*